United States Patent [19]

Davis

[11] 4,365,817
[45] Dec. 28, 1982

[54] SELF ALIGNING SEGMENTED SHAFT SEAL

[75] Inventor: Arthur M. Davis, Wixom, Mich.

[73] Assignee: Williams Research Corporation, Walled Lake, Mich.

[21] Appl. No.: 255,314

[22] Filed: Apr. 17, 1981

[51] Int. Cl.³ .............................................. F16J 15/32
[52] U.S. Cl. .................................. 277/188 R; 277/189; 277/194; 277/195; 277/199
[58] Field of Search ............... 277/192, 193, 194, 195, 277/199, 188 R, 189

[56] References Cited

U.S. PATENT DOCUMENTS

| | | | |
|---|---|---|---|
| 1,331,362 | 2/1920 | Parsons et al. | 277/194 |
| 1,334,393 | 3/1920 | Parsons et al. | 277/192 |
| 3,257,118 | 6/1966 | Broadhead et al. | 277/188 R |
| 3,277,797 | 10/1966 | Tyree et al. | 277/188 R |
| 3,920,251 | 11/1975 | Remberg | 277/192 |
| 4,039,197 | 8/1977 | Schmidt | 277/188 R |
| 4,169,605 | 10/1979 | Nishimoto | 277/188 A |
| 4,266,788 | 5/1981 | Ludwig | 277/193 |

FOREIGN PATENT DOCUMENTS 527502  6/1931  Fed. Rep. of Germany ...... 277/194

Primary Examiner—Robert I. Smith
Attorney, Agent, or Firm—Lyman R. Lyon

[57] ABSTRACT

The disclosure relates to a ring type seal with positive self centering anti-rotation characteristics intended to enhance seal life and reliability by elimination of lateral displacement forces arising from conventional anti-rotational features which may cause uneven or excessive seal wear. The invention disclosed is particularly suited to segmented ring seal constructions.

6 Claims, 5 Drawing Figures

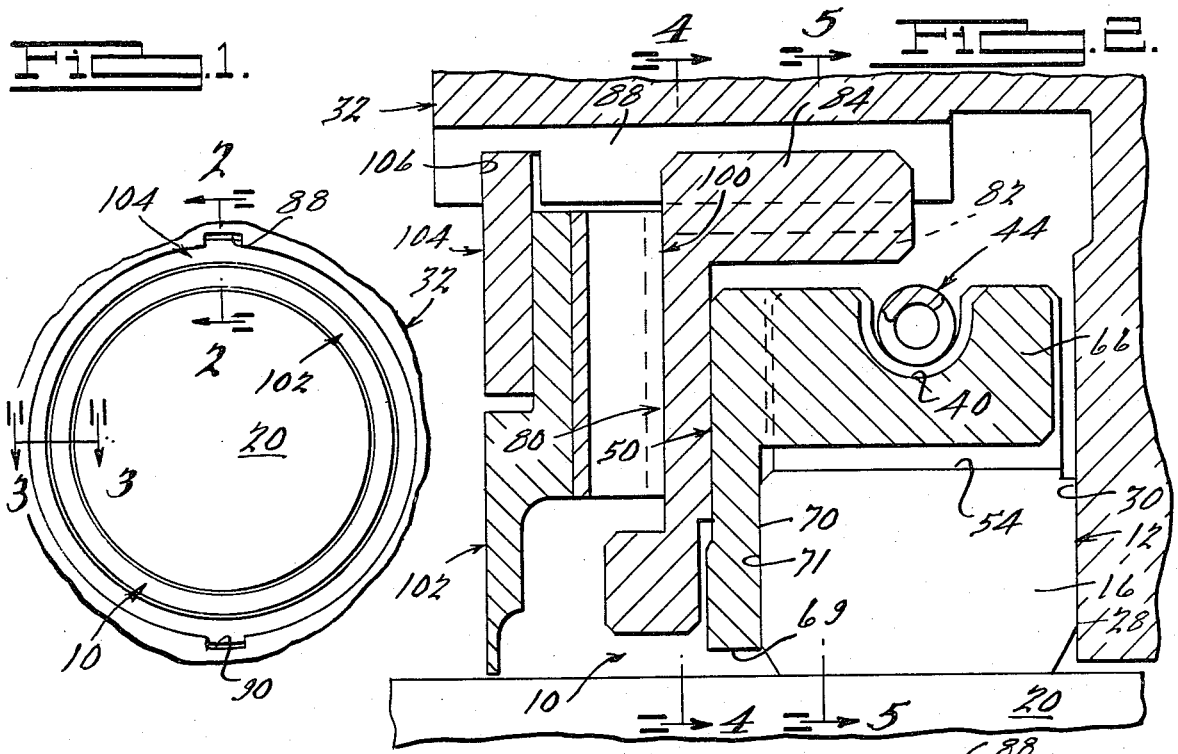
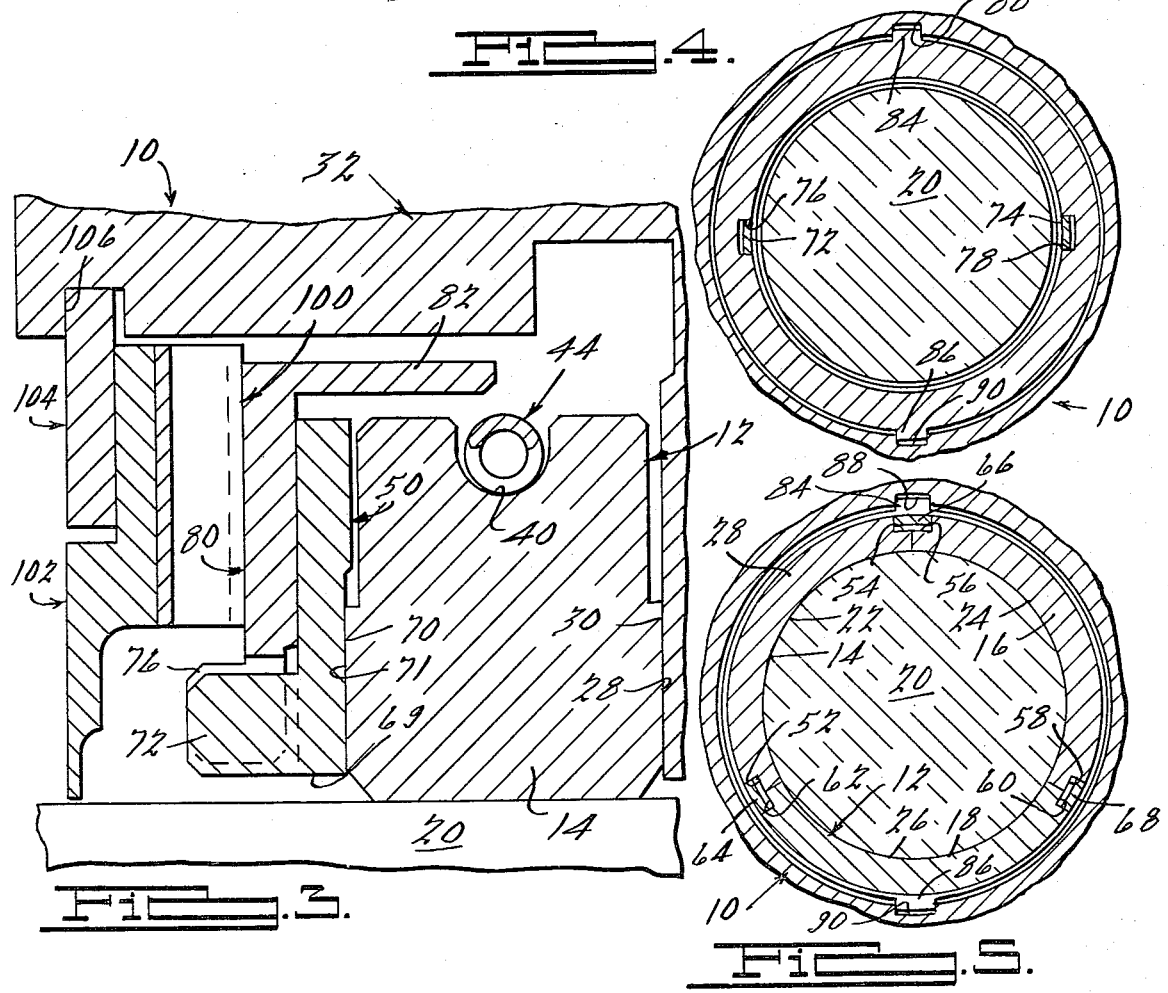

SELF ALIGNING SEGMENTED SHAFT SEAL

BACKGROUND OF THE INVENTION

Conventional segmented seals generally comprise one or more arcuate segments that surround a rotatable or reciprocable shaft with the seal elements held by a fluid pressure and/or light spring force in intimate contact with both the shaft and a stationary surface on the seal housing extending radially of the shaft axis. The seal segments are prevented from rotating about the shaft by one or more stationary pins or lugs located on the radial surface of the housing and loosely engaging holes or slots in the segments. Details of construction vary widely to suit particular applications and to follow the design practices of various manufacturers. However, the use of rigidly fixed anti-rotation features seems to be virtually universal.

The seal segments are usually held together in ring form by a surrounding "garter" spring which also holds the segments in light but intimate contact with a rotating or reciprocating shaft. The seal segments are usually proportioned to leave extremely small circumferential gaps between abutting segments to assure radial contact with the rotating shaft surface and to permit a "wearing in" process to occur. Seal segments may vary from a single one piece type with one circumferential gap to quite complex sets of two, three or more segments. However, all known segmented seal constructions share the common principle of limited radial freedom with fixed circumferential restraint which requires that the restraining features must be very accurately located relative to the rotating shaft axis.

The anti-rotation pins or lugs usually employed in segmented seals as described above require a prohibitively high order of accuracy in the manufacture of the related elements. Further, the stationary seal housing must be very accurately centered relative to the shaft axis if radial loads on the seal segments are to be avoided. The relatively loose engagement of the anti-rotation pins or lugs in their corresponding holes or slots in the ring segments is frequently cited by seal manufacturers as the means of accommodating displacements of the stationary anti-rotation features relative to the shaft axis. However, a critical examination of the geometric principles involved demonstrates that elimination of radial load occurs only when the pins or lugs are precisely located in only one position. Lateral displacement from this position will generally result in only one of the anti-rotation pins providing the anti-rotation torque with a resultant lateral force being generated on the sealing surface to provide the required reaction to maintain the force balance equilibrium of the seal segment. This produces excessive and uneven wear because of the continuous lateral force on the circular sealing surface of the seal segment due to a "camming" action. This force can be relieved only by seal segment wear and in an extreme case a seal could be literally "worn out" before it is "worn in".

In most cases the positional errors due to manufacturing and assembly are small, and generally satisfactory results are achieved, but the predictable life of a seal is uncertain and the variables described above may produce unacceptable results where maximum and dependable seal life is essential.

SUMMARY OF THE INVENTION

This invention employs a double cross slide principle to prevent the seal segments from rotating while allowing complete lateral freedom to center around the shaft. Lateral forces are eliminated and the seal segments are able to seek and maintain a neutral position where minimum wear and leakage will occur. The double slide principle is applied by the introduction of only one member in addition to the equivalent parts which might otherwise normally be used in a conventional segmented ring seal to meet similar installation and service requirements. The seal of the instant invention comprises a plurality of carbon seal segments that are retained by a primary retention ring. The primary retention ring has anti-rotation lugs on one face which engage matching slots or steps in the carbon seal segments and a narrow inner rim on the opposite face from which two diametrically opposite lugs project.

A secondary retention ring has an axially projecting radially inner rim interrupted by two radial slots which engage corresponding lugs on the primary retention ring. The secondary ring has an outer rim projecting axially in the opposite direction from the inner ring with two radially outwardly projecting diametrically opposed lugs located at right angles to the inner slots therein.

A circumferentially disposed coil type "garter" spring retains the carbon seal segments as an assembled ring in combination with the primary retention ring by means of suitable grooves and slots in the ring segments and anti-rotation lugs.

An enclosing seal housing of cylindrical form has an integral radially extending precision lapped end face partially closing one end of the housing and providing a mating surface against which one face of the seal segments bear in the assembled state. The radially inner facing cylindrical surface of the housing is provided with two diametrically opposed longitudinal slots which engage the outwardly projecting lugs on the secondary retention ring.

A low force low rate wave spring bears against the secondary retention ring, which bears against the primary retention ring, which bears against the carbon seal segments which, in turn, bear against the lapped end face on the housing.

A spring keeper washer bears against the opposite side of the wave spring and loads it in compression through the above described sequence. The washer, in turn, is retained by a spring retaining ring which engages an annular groove in the housing and is "trapped" by a projecting shoulder on the spring keeper washer.

The seal housing may be a separate entity or it may comprise a suitable recess in a casting.

The radial slots and lugs discussed above are proportioned to permit completely free radial motion of the related parts within prescribed limits while simultaneously limiting circumferential play or backlash to very low values by means of carefully controlled side fits of the lugs and slots.

BRIEF DESCRIPTION OF THE DRAWINGS

FIG. 1 is a view of seal of the instant invention disposed about a shaft;

FIG. 2 is a cross-sectional view taken substantially along the line 2—2 of FIG. 1;

FIG. 3 is a view taken substantially along the line 3—3 of FIG. 1;

FIG. 4 is a view taken substantially along the line 4—4 of FIG. 2;

FIG. 5 is a view taken substantially along the line 5—5 of FIG. 2.

DETAILED DESCRIPTION OF THE PREFERRED EMBODIMENTS

Referring to the drawings, the instant invention can be applied to seals having any desired number of segments. In a constructed embodiment, a seal 10 comprises a seal ring or element 12 made up of three carbon segments 14, 16 and 18. The seal 10 is adapted to be installed about a shaft 20, radially inner faces 22, 24 and 26 of the segments 14, 16 and 18, respectively, being disposed in intimate sliding sealing contact with the shaft 20.

The segments 14, 16 and 18 are provided with radial faces, respectively, one of which is shown in FIGS. 2 and 3 and designated by the numeral 28. The faces 28 are lapped or otherwise precisely fitted for sliding sealing engagement with a radial end face 30 on a seal housing 32. The housing 32 may comprise, for example, a counterbore in a casting or may be a discrete housing adapted to be fitted into a complementary recess in an engine casting, or otherwise attached to the engine or journal for the shaft 20.

Each of the seal segments 14, 16 and 18 is provided with an annular outwardly facing groove 40 for the acceptance of a circumferential coil type or "garter" spring 44 which exerts a radially inward bias on the segments 14, 16 and 18 so as to maintain the radially inward sealing faces 22, 24 and 26 thereof in sealing engagement with the shaft 20. The "garter" spring 44 also retains the carbon seal elements 14, 16 and 18 as an assembly in combination with a primary retention ring 50 and the housing 32.

As best seen in FIG. 5 of the drawings, opposite ends of the seal segments 14, 16 and 18 are provided with notches 52-54, 56-58, and 60-62 for the acceptance of three axially extending radially outer lugs 64, 66 and 68, respectively, on the primary retention ring 50. The lugs 64, 66 and 68 on the primary retention ring 50 preclude circumferential movement or "indexing" of the segments 14, 16 and 18 relative to the primary retention ring 50.

As best seen in FIGS. 2 and 3 of the drawings, the primary retention ring 50 comprises a washer-like element having a central aperture 69 relatively larger in diameter than the shaft 20 so as to provide clearance therebetween. The primary retention ring 50 has a radially extending face 70 for engagement with complementary radial faces on the segments 14, 16 and 18, one of which is shown and designated by the numeral 71, thereby to provide for radial movement of the segments 14, 16 and 18 relative to the primary retention ring 50, as well as to the face 30 of the housing 32. In addition, the primary retention ring 50 has a pair of radially inner lugs 72 and 74 which extend axially in the opposite direction to the lugs 64, 66 and 68 for engagement in complementary notches 76 and 78 in a secondary retention ring 80.

As best seen in FIG. 2, an outer rim 82 of the secondary retention ring 80 projects axially towards the segments 14, 16 and 18, two outwardly projecting diametrically opposed lugs 84 and 86 thereon being located ninety degrees from the inner slots 76 and 78 for engagement in a pair of axially extending slots 88 and 90 in the housing 32.

A low force, low rate, wave spring 100 bears against the secondary retention ring 80 so as to provide an axial bias thereon which is transmitted, in turn, to the primary retention ring 50, the carbon segments 14, 16 and 18 thence to the lapped end face 30 of the housing 32.

The wave spring 100 is retained by a spring keeper washer 102 which loads the spring in compression and which, in turn, is retained by a spring retainer ring 104 which is seated in an annular groove 106 in the housing 32.

The notches 52-54, 56-58 and 60-62 in the seal segments 14, 16 and 18, respectively, which accept the lugs 64, 66 and 68, the notches 76 and 78 which accept the lugs 72 and 74, respectively, and the grooves 88 and 90 which accept the lugs 84 and 86, respectively, are proportioned to permit completely free radial motion of the respective parts within prescribed limits, while simultaneously limiting circumferential play or backlash.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A segmented seal comprising
a cylindrical seal housing having a radially extending end face and an axially extending radially inwardly opening groove in the cylindrical wall thereof,
a plurality of seal segments having first radial faces, respectively, slidably engaged with the radial end face on said housing in sealing engagement, arcuate radially inner faces engageable with a shaft in slidable sealing engagement, and second radially extending faces spaced from the first faces thereon, respectively,
first resilient means biasing said seal segments radially inwardly,
a first retainer ring having a radial face slidably engaged with the second faces on said seal segments, said first retainer ring having a first axially extending lug thereon engageable with at least one of said segments to preclude relative circumferential movement between said segments and said first retainer yet permit relative radial movement therebetween, said first retainer ring having a second axially extending lug thereon,
a second retainer ring having an axially extending slot therein for the acceptance of the second lug on said first retainer ring, said second retainer ring having a radially extending lug thereon engaged in the axial slot in said housing,
second resilient means for biasing said second retainer axially against said first retainer, said first retainer against said segments, and said segments against the end face on said housing, and,
means engaged with said housing for axially positioning and retaining said second resilient means, second retainer, first retainer, and segments relative to the end face on said housing.

2. A segmented seal in accordance with claim 1 wherein said segments have an annular groove on the radially outer surface thereof for the acceptance of said first resilient means.

3. A segmented seal in accordance with claim 1 wherein the first and second lugs on said first retainer ring extend axially in opposite directions.

4. A segmented seal in accordance with claim 1 wherein each of said seal segments has notched end portions for the acceptance of the first lugs on said first retainer ring.

5. A segmented seal in accordance with claim 1 wherein the axially extending slots on said second retainer ring are spaced ninety degrees from the radially extending lugs thereon.

6. A segmented seal in accordance with claim 1 wherein said second resilient means comprises a washer type wave spring.

* * * * *